(12) United States Patent
Tateiwa

(10) Patent No.: US 7,133,589 B2
(45) Date of Patent: Nov. 7, 2006

(54) TAPE FIBER AND METHOD FOR TREATING SAME

(75) Inventor: Akihiko Tateiwa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 119 days.

(21) Appl. No.: 10/692,729

(22) Filed: Oct. 27, 2003

(65) Prior Publication Data

US 2004/0091226 A1 May 13, 2004

(30) Foreign Application Priority Data

Oct. 28, 2002 (JP) ............................. 2002-312664

(51) Int. Cl.
*G02B 6/44* (2006.01)
*G02B 6/25* (2006.01)

(52) U.S. Cl. ........................................ 385/114; 385/85

(58) Field of Classification Search ................ 385/114, 385/85, 124; 451/41
See application file for complete search history.

(56) References Cited

U.S. PATENT DOCUMENTS

| 5,245,684 | A | * | 9/1993 | Terao et al. ................... 385/78 |
| 5,265,381 | A | * | 11/1993 | Takahashi ..................... 451/41 |
| 6,393,187 | B1 | * | 5/2002 | Engelberth et al. .......... 385/115 |
| 6,632,026 | B1 | * | 10/2003 | Baba et al. ..................... 385/85 |
| 6,731,837 | B1 | * | 5/2004 | Goldberg et al. .............. 385/27 |
| 6,826,347 | B1 | * | 11/2004 | Matsumoto et al. ......... 385/137 |
| 6,890,243 | B1 | * | 5/2005 | Matsui et al. .................. 451/41 |
| 6,957,920 | B1 | * | 10/2005 | Luther et al. .................. 385/85 |
| 2003/0077034 | A1 | * | 4/2003 | Chiba et al. ................... 385/31 |

FOREIGN PATENT DOCUMENTS

| JP | 4-025805 | 1/1992 |
| JP | 6-186501 | 7/1994 |
| JP | 2001-324647 | 11/2001 |

* cited by examiner

*Primary Examiner*—Rodney Bovernick
*Assistant Examiner*—Mike Stahl
(74) *Attorney, Agent, or Firm*—Staas & Halsey LLP

(57) ABSTRACT

A tape-like optical fiber cable comprises a plurality of optical fibers arranged in parallel to each other and each abutted to an adjacent fiber. Each of the optical fibers includes a cover and a lead extending therefrom. A method of forming an inclined surface at a terminal face of each lead comprises the steps of: pushing the respective leads of the optical fibers in parallel and together toward a grinding surface of a grinding means while moving in a certain direction so that terminal portions of the respective leads are simultaneously resiliently bent to form an inclined surfaces at the terminal faces of the respective leads.

10 Claims, 4 Drawing Sheets

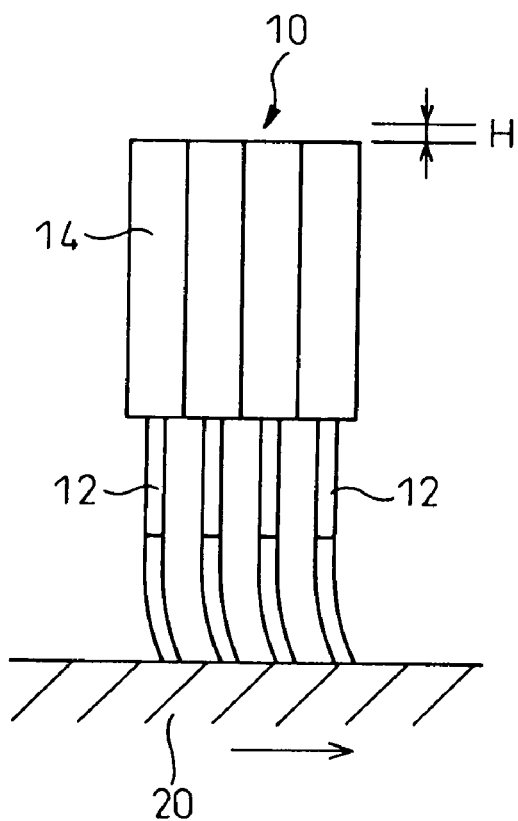
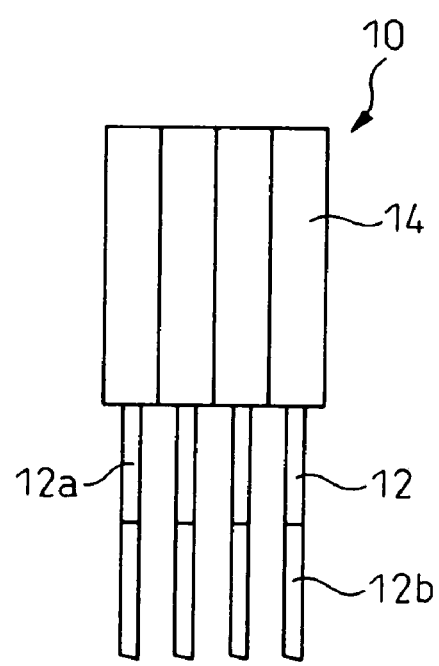

TAPE FIBER AND METHOD FOR TREATING SAME

BACKGROUND OF THE INVENTION

1. Field of the Invention

The present invention relates to an optical fiber and a method for forming an optical fiber and, more particularly, to an optical fiber cable having a flat tape-like configuration including a plurality of optical fibers arranged in parallel to each other and abutted to the adjacent one, hereinafter referred to as "tape-like fiber cable" and a method for treating or forming a terminal face of the optical fiber of such a tape-like fiber cable.

2. Description of the Related Art

FIGS. 4(a) and 4(b) are plan and side views illustrating a general structure of a conventional tape-like optical fiber cable, in which a plurality of optical fibers are arranged in parallel to each other and each is also mutually adhered to the adjacent fiber. Each fiber includes a lead 12 (optical fiber including a core portion and a cladding portion, hereinafter referred to as "lead") and a cover 14 for covering the lead 12. In the example shown in FIG. 2, the tape-like fiber cable 10 is used as a collimator for emitting a parallel luminous flux from a terminal face of a lead 12. Also, a terminal face of the "graded index optical fiber" (GI optical fiber) 12b having a certain length is fused to the terminal face of the lead 12 which is a single mode optical fiber 12a.

Such a conventionally known tape-like fiber cable is disclosed, for example, in Japanese Unexamined Patent Publications Nos. 4-25805 and 6-186501.

In the fiber cable used as a collimator, the terminal face of the lead 12 is formed as an inclined surface 12c with respect to the optical axis in order to reduce the optical return loss at the terminal of the optical lead.

In this tape-like fiber cable 10, the terminal face 12c of the lead 12 is an inclined surface which is inclined downward with respect to the plane in which the tape-like fiber cable 10 is arranged. In other words, the light emitted from the lead 12 travels in a direction (upward) to cross the plane in which the tape-like fiber cable 10 is arranged. Therefore, if a pair of such tape-like optical cables are used to form an optical device, as shown in FIG. 5, the tape-like fiber cables must be arranged so that the terminal faces thereof are inclined upward and downward, respectively. This is because, when the light passes through the inclined surface, the light is refracted because the terminal faces of the leads 12 are inclined with respect to the optical axis.

In order to make an optical device in such a manner that the light emitted from the lead travels in the same plane as that the tape-like fiber cable is arranged, as shown in FIG. 6, the terminal faces of the leads 12 of the respective fibers are formed so as to be inclined by a common angle θ for the end surfaces of all of the leads 12, such as disclosed in Japanese Unexamined Patent Publication No. 2001-324647. In this tape-like fiber cable, in the same manner as the tape-like fiber cable is shown in FIGS. 4(a) and 4(b), the leads 12 of the tape-like fiber cable are supported by a jig and the angle of the jig is controlled in such a manner that the terminal faces of the leads 12 of the respective fibers can be ground to be inclined by a certain angle However, as mentioned above, if the tape-like fiber cable shown in FIGS. 4(a) and 4(b) is to be incorporated in an optical device, it is necessary to support the tape-like fiber cable 10 using a support 16 such as that shown in FIG. 5. Therefore, positioning of the tape-like fiber cable 10 is very difficult and manufacturing of such a support 16 is also very difficult.

On the other hand, as shown in FIG. 6, if the tape-like fiber cable is constituted to be arranged in a plane, it is relatively easy to incorporate the tape-like fiber cable into a device. Nevertheless, if the tape-like fiber cable is to be used for a collimator tape fiber, it is very difficult to accurately arrange that the GI optical fiber 12b has a precise predetermined length and, therefore, a necessary function as a collimator may not fully be attained.

The function as a collimator can be obtained by controlling the length of the GI optical fiber 12b to ¼ of the wave length or to a cardinal number of times thereof. However, as shown in FIG. 6, if a grinding operation was conducted in such a manner that terminal faces of all leads be cut at a common angle of θ, the length of the respective GI optical fibers 12b would not be uniform. It is required that the accuracy in the length of GI optical fiber 12b must be less than several Am and, therefore, the tape-like optical fiber cable as shown in FIG. 6 is not appropriate to use as a collimator. In addition, in the tape-like optical fiber cable as shown in FIG. 6, when the GI optical fiber 12b is fused to the lead 12, it may be possible to regulate the position where the GI optical fiber 12b is fused to the single mode optical fiber 12a, in consideration of the finished length of the GI optical fiber 12b. However, such a method is very complicated and it would be very difficult to precisely form the optical fibers.

SUMMARY OF THE INVENTION

Therefore, an object of the present invention is to provide a tape-like optical fiber cable and a method for forming such a tape-like optical fiber cable, capable of forming a terminal face of the respective lead of the optical fiber as an inclined surface so that the optical fiber cable can be used as a collimator.

According to the present invention, there is provided a tape-like fiber cable comprising: a plurality of optical fibers arranged in parallel to each other and each fiber abutted to an adjacent fiber, each of the optical fibers including a cover and a lead extending from the cover, the extending portion of the lead comprising a single mode optical fiber, adjacent to the cover, having a terminal face and a graded index optical fiber fused to the terminal face of the single mode optical fiber; a terminal face of the respective lead being formed as an inclined surface which is inclined with respect to a plane perpendicular to an optical axis of the lead; a plane of this tape-like fiber cable and the respective terminal faces of the leads perpendicularly intersect with respect to each other and an intersection between the plane of this tape-like fiber cable and the terminal face is inclined by an angle θ with respect to the optical axis of the lead.

According to another aspect of the present invention, there is provided a method of forming an inclined surface at a terminal face of a lead of an optical fiber including a cover and the lead extending therefrom, said inclined surface being inclined at a certain angle with respect to a plane perpendicular to an optical axis of the lead, said method comprising the following steps of: pushing the terminal face of the lead of the optical fiber toward a grinding surface of a grinding means while moving in a certain direction so that a terminal portion of the lead is resiliently bent to form the inclined surface at the terminal face of the lead.

According to a still another aspect of the present invention, there is provided method of forming an inclined surface at a terminal face of each lead of a plurality of optical fibers, arranged in parallel to each other and each abutted to adjacent fiber to define a tape-like optical fiber cable, each of the optical fibers including a cover and the lead extending therefrom, said inclined surface being inclined by a certain angle with respect to a plane perpendicular to an optical axis of the respective lead, said method comprising the following steps of: pushing the respective leads of the optical fibers in parallel and together toward a grinding surface of a grinding means while moving in a certain direction so that terminal portions of the respective leads are resiliently bent simultaneously to form the inclined surfaces at the terminal faces of the respective leads.

In this method, each of the optical fibers includes the cover and the lead extending therefrom, the extending portion of the lead comprises a single mode optical fiber, adjacent to the cover, having a terminal face and a graded index optical fiber fused to the terminal face of the single mode optical fiber and having an inclined terminal face, so that the tape-like optical fiber cable can be used as a collimator, and the terminal faces of graded index optical fibers are pushed toward the grinding surface to form the inclined surfaces at the terminal faces of the respective graded index optical fibers.

BRIEF DESCRIPTION OF THE DRAWINGS

FIGS. 3(a) and 3(b) show a method for grinding the tape-like fiber cable;

DETAILED DESCRIPTION OF THE PREFERRED EMBODIMENTS

Figure 1A:
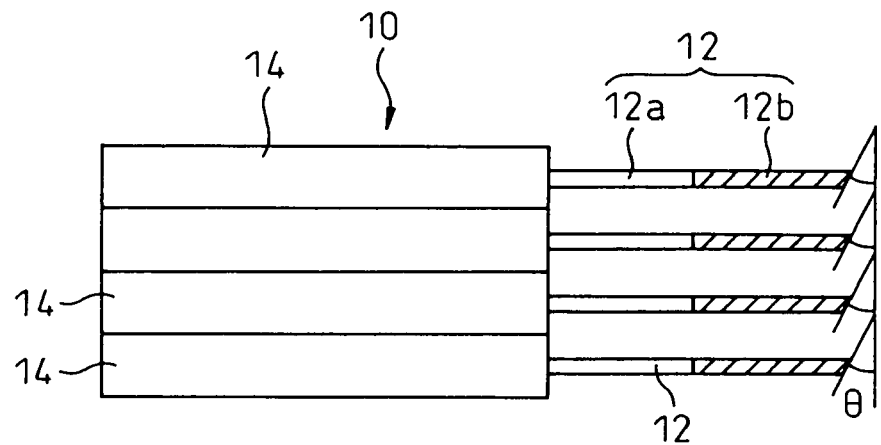
FIGS. 1(a) and 1(b) are plan and side views showing an embodiment of tape-like fiber cable according to this invention.
Figure 1B:
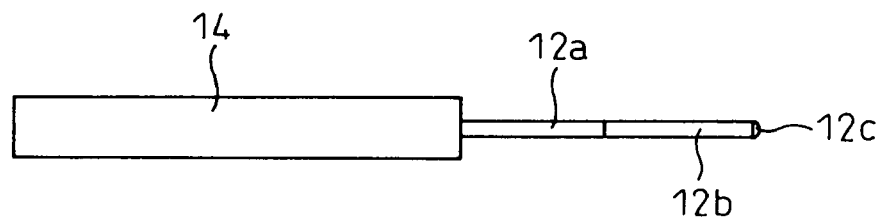

Referring now to the drawings, a preferred embodiment of this invention will be described in detail. FIGS. 1(a) and 1(b) are plan and side views showing an embodiment of a tape-like fiber cable according to the present invention.

The tape-like fiber cable 10 includes four optical fibers arranged in parallel to each other and mutually adhered to an adjacent one to form a flat tape-like cable. The respective optical fibers include respective leads 12 and respective covers 14. The lead 12 of the respective optical fiber is covered by the respective cover 14 and extends from the end of respective cover 14. Reference numeral 12a denotes a single mode optical fiber and the reference numeral 12b denotes a graded index (GI) optical fiber 12b. The GI optical fiber 12b is fixedly welding to a terminal face of the single mode optical fiber 12a so as to have a predetermined length.

The most important feature of the tape-like fiber cable 10 according to this embodiment is that the terminal faces 12c of the respective leads 12 are individually formed to be inclined by an angle of θ in a plane of the tape-like fiber cable 10 (the plane in which the leads 12 are arranged), as shown in FIG. 1(a).

As mentioned above, if the terminal faces 12c of the respective leads 12 are individually formed to be inclined by a predetermined angle, the length of the GI optical fibers 12b can be made uniform and the terminal face 12c of the lead 12 can be formed to have an inclined face and, thus, a tape-like fiber cable having necessary functions as a collimator can be provided.

Figure 2:
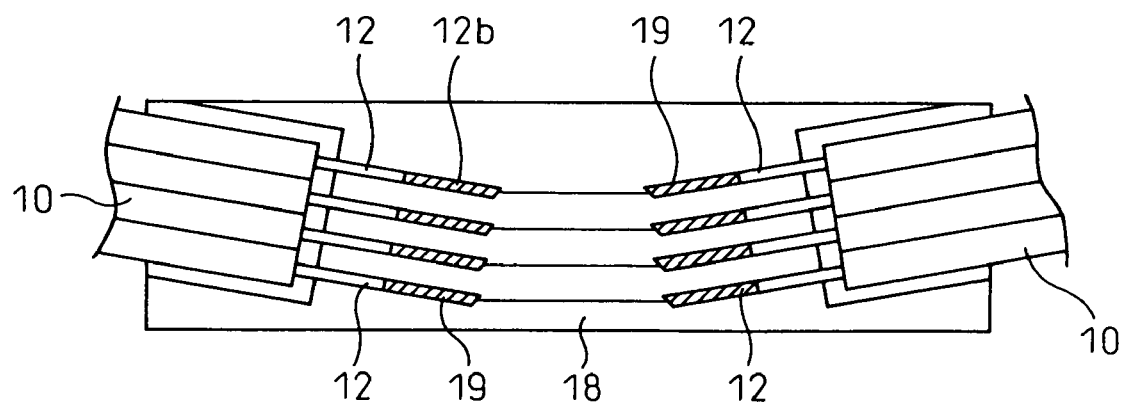
FIG. 2 shows a method for incorporating the tape-like fiber cable of this invention into an optical device.
Figure 4A:
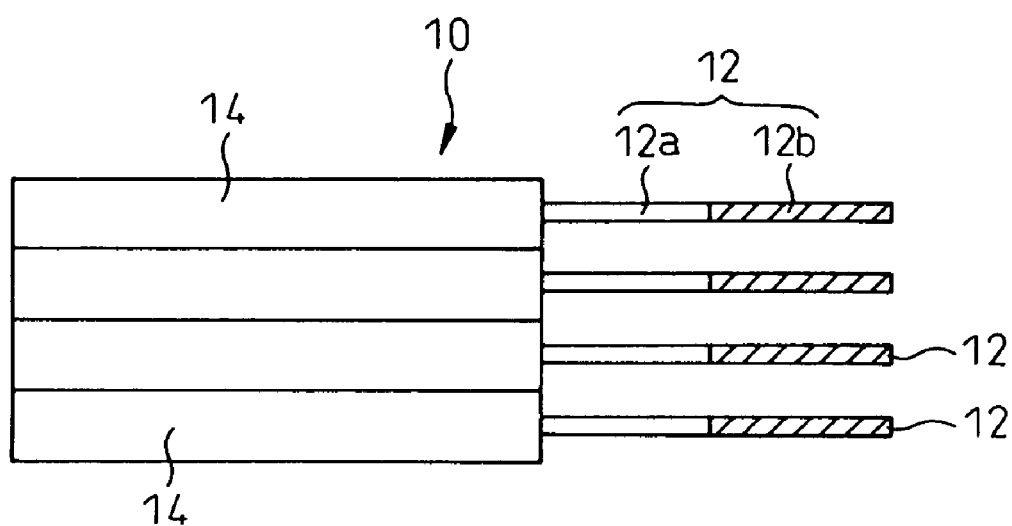
FIGS. 4(a) and 4(b) are plane and side views of the tape-like fiber cable formed by a method known in the prior art.
Figure 4B:
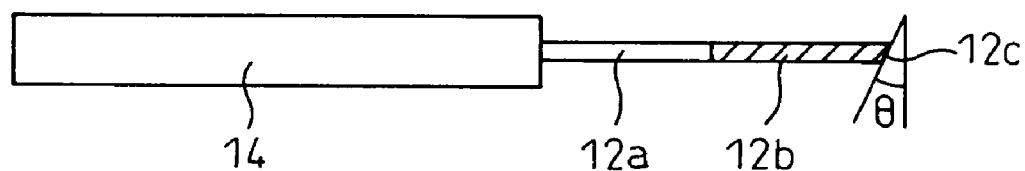
Figure 5:
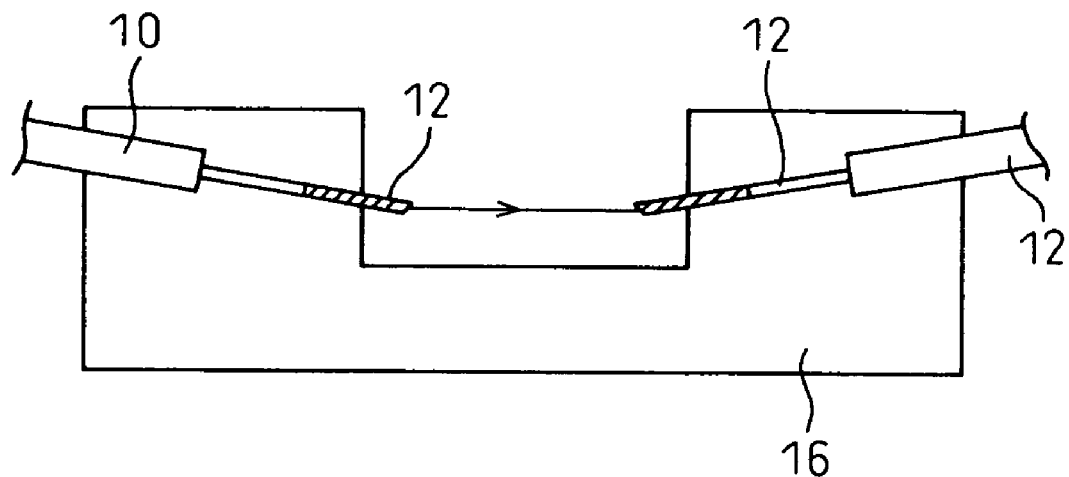
FIG. 5 shows a method for incorporating the tape-like fiber cable into an optical device known in the prior art.

FIG. 2 shows a method for incorporating the tape-like fiber cable 10 into an optical device. In the tape-like fiber cable 10 according to this embodiment, the terminal faces 12c of the respective leads 12 are formed to be inclined by a predetermined angle (θ) in a plane of the tape-like fiber cable 10, i.e. the terminal face 12c is perpendicular to the plane of the tape-like fiber cable and a straight line intersecting with the plane of the tape-like fiber is inclined by an angle θ, the light emitted from the terminal face 12c of the lead 12 travels in the plane of the tape-like fiber cable 10. Therefore, when a pair of the tape-like fiber cables 10 are to be incorporated into the optical device, as shown in FIG. 2, the tape-like fiber cables 10 are arranged in such a manner that the respective leads 12 of one of the pair of fiber cables 10 are opposed to the respective leads 12 of the other fiber cable 10 on a mounting surface of the support 18 and the angles of the respective leads are adjusted.

The support 18 has a flat mounting surface on which the pair of the tape-like fiber cables 10 are mounted and is provided with V-grooves 19 on the mounting surface along the positions on which the leads of the tape-like fiber cables 10 are arranged. Thus, the leads 12 can be first disposed along the V-grooves 29 when the pair of the tape-like fiber cables 10 are mounted on the support 18. Thus, the tape-like fiber cables 10 can be easily and accurately positioned and incorporated into the optical device.

It is relatively easy to form the V-grooves 19 accurately by machining the support 18 at a predetermined angle along which the V-grooves 19 are arranged. Thus, the manufacturing cost of the support 18 is relatively low and an operation for incorporating the tape-like fiber cables 10 into the support 18 is relatively easy.

Figure 6:
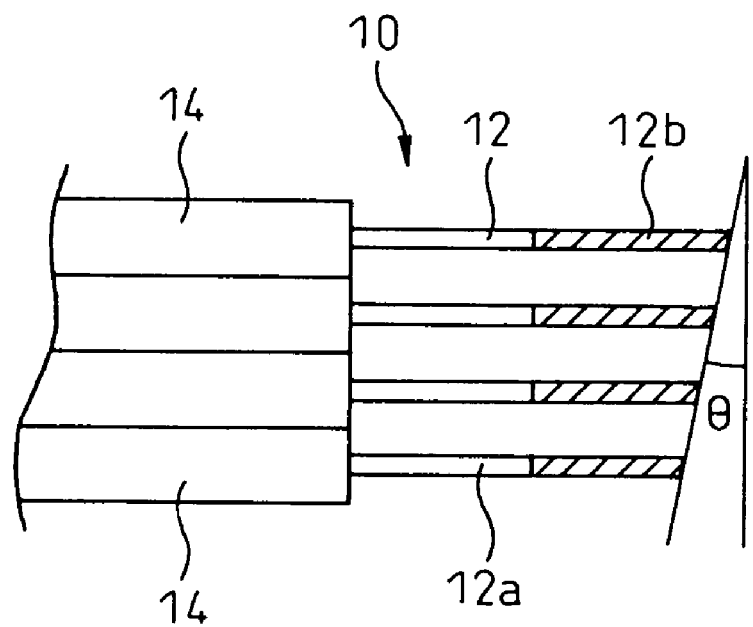
FIG. 6 shows a method for grinding the tape-like fiber cable known in the prior art.

In the tape-like fiber cable 10 shown in FIG. 1, the terminal face of the lead 12 is ground to provide an inclined surface having a predetermined angle. When the terminal face of the lead 12 is to be ground to provide such an inclined surface, in general, the leads 12 should be supported, one by one, by a jig (not shown) and the terminal face of the lead 12 is ground by a grinding table (not shown). However, in this case, it is practically impossible to support the leads 12, one by one, by the jig due to the structure of the grinding apparatus. Therefore, as shown in FIG. 6, all of the leads 12 are supported together so as to be oblique by a certain angle and the terminal faces of the respective leads 12 are ground. In this case, however, a tape-like fiber cable 10 having a plurality of lead terminals as shown in FIG. 1 cannot be obtained.

Thus, in a method for manufacturing the tape-like fiber cable 10 according to this invention, as one method for forming the terminal face as an inclined surface having a certain angle, the optical fibers are ground by using the elastic deformability of the leads 12. Although the leads 12 of the optical fibers 10 are made of silicon oxide and, therefore, the lead 12 itself is relatively hard and fragile, a lead 12 can be deformed to a certain extent due to its own flexibility and elasticity. Therefore, as shown in FIG. 3(a), the terminal faces of the leads 12 can be ground to provide inclined surfaces while the leads 12 are deformed by a certain extent while the tape-like fiber cable 10 is supported.

FIG. 3(a) shows a state of a grinding operation to form the terminal faces of the leads 12 of the tape-like fiber cable 10 using a grinding table 20 which rotates in a certain direction. As illustrated, while the grinding table 20 is rotating in a certain direction, the terminal faces of the leads 12 are brought into contact with and pushed toward the rotating grinding table 20, so that all of the terminal portions of the leads 12 are bent in a certain direction, so that the terminal faces of the leads 12 are ground to provide inclined surfaces having a certain angle. If the "pushing distance" H of the tape-like fiber cable 10 is changed, the "amount of bend" of the fiber cable 10 can be controlled.

Table 1 shows experimental results explaining how the angle of the inclined surface at the terminal face of the lead was changed when the "pushing distance" H of the tape-like fiber cable 10 was changed. In this experiment, a diamond-grinding sheet was used as a grinding sheet and the grinding time was 2 minutes.

TABLE 1

| | Pushing distance (μm) | | | | | |
|---|---|---|---|---|---|---|
| | 20 | 30 | 40 | 50 | 70 | 100 |
| Grinding angle (°) | 6.2 | 6.4 | 6.7 | 7.1 | 8.0 | 9.5 |

As can be understood from Table 1, it was confirmed that, if the "pushing distance" H is increased, the angle of the inclined terminal face of the lead 12 is increased.

Table 2 shows experimental results explaining how the angle of the inclined terminal face of the lead 12 was changed when the number of channels (number of optical fibers) of the tape-like fiber cable was changed from 1 to 4, under conditions that the "pushing distance" H of the optical fibers was 50 μm, a diamond-grinding sheet was used as a grinding sheet and the grinding time was 2 minutes, in the same manner as the above experiments shown in Table 1.

TABLE 2

| ch | 1 ch | 2 ch | 3 ch | 4 ch |
|---|---|---|---|---|
| Angle (°) | 6.834 | 7.038 | 7.097 | 6.861 |

As can be understood from Table 2, even for a 4-channel tape-like fiber cable, unevenness in the angles of the inclined terminal faces of the respective leads 12 were within an allowable range.

In the case of a tape-like fiber cable used as a collimator, it is necessary to accurately control the length of the GI optical fiber 12b and, therefore, when a grinding table is used to grind the terminal face of the lead 12, the length of the GI optical fiber 12b is simultaneously monitored while the terminal face of the lead 12 is being ground. As shown in FIG. 3(a), the pushing force exerted on the respective leads 12 is controlled to be uniform and constant, so that the respective terminals of the leads 12 are constantly bent. Thus, the respective leads 12 can be formed to have a constant length.

According to the method for grinding the leads 12 while the respective terminals of the leads 12 are bent in the same direction, it is possible to easily finish the GI optical fiber 12b to have a certain constant length and also to finish the terminal faces 12c of the individual leads 12 to have a certain accurate angle.

FIG. 3(b) shows a tape fiber cable 10 obtained by a method as mentioned above. As described above, for one tape-like fiber cable 10, the dispersion in the angle of the individual leads 12 was equal to or less than ±0.2°. It should be noted that this dispersion is within an allowable range that can be used as a collimator. In addition, it is also possible to reduce the surface roughness of terminal face of the lead 12 to 10 nm or less by regulating the grinding conditions. Thus, the terminal face of the lead 12 can be formed so as be adaptable to optical use.

In order to make the orientation of the inclined surface of the terminal faces of the leads 12 to be that in a plane of the tape-like fiber cable, it is necessary that the respective leads 12 of the tape-like fiber cable 10 be bent in the same plane as the plane of the tape fiber cable 10. That is to say, the respective leads 12 must be bent, parallel to each other, in a direction in the plane of the tape fiber cable 10. Therefore, it should be noted that, in FIG. 3(a), the tape fiber cable 10 is arranged so that the plane thereof conforms to the moving direction of the grinding wheel and, thus, all of the leads 12 can be bent parallel to the plane of the tape-like fiber cable 10 so that all of the leads 12 are inclined in the plane of the tape fiber cable 10.

Therefore, when the leads 12 are ground by the grinding wheel 20, the orientation of the inclined surfaces to be formed at the terminal face of the respective leads 12 can be regulated by changing the set position where the tape-like fiber cable 10 is arranged with respect to the grinding wheel 20. Consequently, if the tape-like fiber cable 10 is arranged so that the plane thereof is perpendicular to the moving orientation of the grinding wheel, the terminals of the respective leads 12 are machined in such a manner that the orientation of the inclined surface thereof is downward with respect to the plane of the tape-like fiber cable 10, that is to say, the intersection between the plane of the tape-like fiber cable 10 and the inclined faces 12c of the leads are perpendicular to the optical axis of the leads 12.

Although the above embodiment is referred to a method for forming a tape-like fiber cable including a plurality of optical fibers joined together to form the above-mentioned flat-type tape fiber cable, this invention can also be applied to a method for forming an inclined terminal face of a lead in a fiber cable including only a single optical fiber.

In the case of forming an inclined terminal face of a lead for only a single optical fiber, as well as simultaneously forming the lead terminal faces of a plurality of optical fibers, this invention can advantageously be used to attain an effective grinding operation.

In case of changing the angle of the inclined terminal faces of the leads, in the prior art, a plurality of jigs for the respective angles must be prepared separately. However, according to a method of the present invention, the angle of the inclined terminal faces of the leads can be easily and speedly adjusted.

Comparing with a jig used in the prior art, according to a method of the present invention, it is easy to make the jigs for supporting a single optical fiber or a tape-like fiber cable including a plurality of leads and such jigs can also be adaptable for supporting any different products.

Depending on the material of the optical fibers, it is possible to easily grind the optical fiber while the progress of the grinding can be checked.

In the tape fiber cable according to the present invention, the light is emitted from the respective lead of the flat-type tape fiber cable, travels in the same plane as that of the tape-like fiber cable and, therefore, the operation of incorporating the tape-like fiber cable can easily be accomplished. According to the method for forming a tape-like fiber cable of the present invention, the terminal face of the lead of the optical fiber can easily be formed and, therefore, can be advantageously used for making a tape fiber cable used as a collimator.

The invention claimed is:

1. A tape-like fiber cable comprising:
   a plurality of optical fibers arranged in parallel to each other and each abutted to an adjacent fiber, each of the optical fibers including a cover and a lead extending from the cover, the extending portion of the lead comprising a single mode optical fiber, adjacent to the cover, having a terminal face and a graded index optical fiber fused to the terminal face of the single mode optical fiber;
   a terminal face of the respective lead being formed as an inclined surface which is inclined with respect to a plane perpendicular to an optical axis of the lead;
   a plane of this tape-like fiber cable and the respective terminal faces of the leads perpendicularly intersect with respect to each other and an intersection between the plane of this tape-like fiber cable and the terminal face is inclined by an angle θ with respect to the optical axis of the lead wherein said leads all have a substantially equal length.

2. A method of forming an inclined surface at a terminal face of each lead of a plurality of optical fibers, arranged in parallel to each other and each abutted to an adjacent fiber to define a tape-like optical fiber cable, each of the optical fibers including a cover and the lead extending therefrom, said inclined surface being inclined by a certain angle with respect to a plane perpendicular to an optical axis of the respective lead, said method comprising:
   pushing the respective leads of the optical fibers in parallel and together toward a grinding surface of a grinding apparatus while moving in a certain direction so that terminal portions of the respective leads are simultaneously resiliently bent to form the inclined surfaces at the terminal faces of the respective leads, and wherein
   each of the optical fibers includes the cover and the lead extending therefrom, the extending portion of the lead comprising a single mode optical fiber, adjacent to the cover, having a terminal face and a graded index optical fiber fused to the terminal face of the single mode optical fiber and having an inclined terminal face, so that the tape-like optical fiber cable can be used as a collimator, and the terminal faces of graded index optical fibers are pushed toward the grinding surface to form the inclined surfaces at the terminal faces of the respective graded index optical fibers.

3. The tape-like fiber cable according to claim 1, wherein the optical fibers include a core portion and a cladding portion within the cover.

4. The tape-like fiber cable according to claim 1, wherein the plurality of optical fibers arranged in parallel are bound to each other by a cover to form the tape-like fiber cable.

5. The tape-like fiber cable according to claim 1, wherein the plurality of optical fibers are made of silicon oxide.

6. The tape-like fiber cable according to claim 1, wherein light emitted from the respective leads of the tape-like fiber cable travels in the same plane as that of the tape-like fiber cable.

7. The method of forming an inclined surface according to claim 2, further comprising changing a pushing distance of the tape-like fiber cable to control an amount of bend in the plurality of optical fibers.

8. The method of forming an inclined surface according to claim 7, further comprising determining the angle of the inclined terminal face of the lead by controlling a pushing distance of the tape-like fiber cable relative to the amount of bend in the plurality of optical fibers.

9. The method of forming an inclined surface according to claim 2, further comprising controlling a pushing force exerted on the optical fibers to be uniform and constant.

10. The method of forming an inclined surface according to claim 2, further comprising regulating an orientation of the inclined surfaces formed at the terminal face of the respective leads of the plurality of optical fibers by changing a set position where the tape-like fiber cable is arranged with respect to the grinding surface of the grinding apparatus.

* * * * *

UNITED STATES PATENT AND TRADEMARK OFFICE
CERTIFICATE OF CORRECTION

| | |
|---|---|
| PATENT NO. | : 7,133,589 B2 |
| APPLICATION NO. | : 10/692729 |
| DATED | : November 7, 2006 |
| INVENTOR(S) | : Akihiko Tateiwa |

It is certified that error appears in the above-identified patent and that said Letters Patent is hereby corrected as shown below:

Column 1, Line 61, after "angle" insert --.--.

Column 2, Line 20, change "Am" to --μm--.

Signed and Sealed this

Tenth Day of April, 2007

JON W. DUDAS
*Director of the United States Patent and Trademark Office*